Patented Nov. 29, 1932

1,889,347

UNITED STATES PATENT OFFICE

HERMAN ALEXANDER BRUSON, OF PHILADELPHIA, PENNSYLVANIA, ASSIGNOR TO THE RESINOUS PRODUCTS & CHEMICAL COMPANY, A CORPORATION OF DELAWARE

PROCESS FOR PREPARING ORGANIC ACIDS AND PRODUCTS

No Drawing.    Application filed May 5, 1930. Serial No. 450,061.

This invention relates to a simple and economical process for preparing alkylated aromatic ketonic acids possessing the general formula:—

$$R—CO—R'—COOH$$

wherein R represents an alkylated aromatic group and R' represents (a) an aromatic nucleus, or (b) an aliphatic nucleus, as exemplified by the compounds (a) Secondary-amyl-benzoyl-o-benzoic acid,

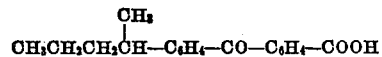

(b) Secondary-amyltoluyl-propionic acid,

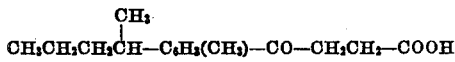

respectively.

Up to the present, acids of the above type have been prepared in the form of lower homologues such as ethylated and propylated benzoyl-benzoic acids or benzoyl-propionic acids by condensing, (a) phthalic anhydride, or (b) succinic anhydride with alkylated aromatic hydrocarbons such as ethyl benzene, propyl benzene, and iso-propyl toluene, in the presence of condensing agents, notably anhydrous aluminum chloride. A complex aluminum compound is formed which upon hydrolysis yields the ketonic acid. Thus ethyl benzene condensed with phthalic anhydride yields ethyl-benzoyl-o-benzoic acid,

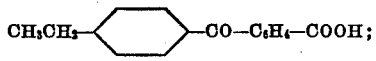

whereas when condensed with succinic anhydride, ethyl-benzene yields ethyl-benzoyl propionic acid

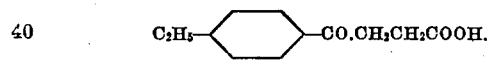

In a similar way other alkylated derivatives of benzene, toluene, naphthalene, etc., have been condensed with anhydrides of dibasic organic acids.

It is obvious that in all of these processes the practice has been to condense the anhydride of a suitable dibasic acid with an alkylated aromatic hydrocarbon.

This presupposes that the alkylated aromatic hydrocarbon must first be prepared and isolated in a sufficient state of purity for the purpose. The lower alkylated aromatic hydrocarbons such as ethyl-benzene or iso-propyl toluene (para-cymene) are readily available or easily prepared and are relatively cheap. However, when it is desired to prepare on a commercial scale higher alkylated aryl derivatives of ketonic acids as described above, namely those derived from butyl-benzene, butyl-toluene, butyl-xylene, butyl-naphthalene, amyl-benzene, amyl-toluene, hexyl-benzene and the like, the high cost of synthesizing these hydrocarbons and thereafter condensing them with acid anhydrides makes the process too expensive.

Now I have found that for certain purposes where an extremely high purity of ketonic acid is not essential, it is unnecessary to prepare, isolate, or use these higher alkylated aromatic hydrocarbons as such, for the above mentioned condensation. I have found that alkylated aryl ketonic acids of the general formula R—CO—R'—COOH wherein R is an alkylated aromatic group and R' an aromatic or aliphatic nucleus, may readily be prepared in an economical manner by reacting upon phthalic anhydride or succinic anhydride respectively, with a mixture of an aromatic hydrocarbon and a suitable aliphatic compound capable of reacting therewith to form in situ the desired alkylated aromatic hydrocarbon in the presence of a condensing catalyst. The aliphatic compounds which may be used for this purpose belong to the group comprising unsaturated aliphatic hydrocarbons containing one double bond, namely the olefines, such as ethylene, propylene, butylene, amylene, hexene, etc., and their hydrohalide addition products such as ethyl chloride, propyl bromide, butyl chloride, amyl chloride, amyl bromide, hexyl bromide and the like. The condensing agents that may be used are those commonly used in effecting Friedel and Crafts type of reactions namely anhydrous aluminum chloride, anhydrous ferric chloride, and stannic chloride. Of these anhydrous aluminum chloride is the most effective.

For example, if one wishes to prepare amyl-benzoyl-benzoic acid by my process, one does not prepare amylbenzene as such and subsequently condense it with phthalic anhydride as has been customary in the past for preparing analogous lower homologues. Instead, one mixes phthalic anhydride, benzene, amylene or amyl chloride, and anhydrous aluminum chloride in approximately equimolecular proportions and allows reaction to take place first at a low temperature (15-25° centigrade) and finally at 40-50° C. until evolution of hydrogen chloride ceases. The complex aluminum compound is then hydrolyzed in the usual manner by decomposing with dilute acid or alkali, and the ketonic acid isolated by methods already known.

I have found in the above case that better results are obtained by the use of amyl chloride than by the use of amylene.

The use of an inert solvent such as o-dichlorbenzene, nitro-benzene or acetylene tetrachloride, assists in giving a fluid mixture that can be more readily stirred and handled. The nature of the amyl compounds obtained varies with the particular isomer of amylene or of amyl halide that is used. In general, normal alkyl halides yield secondary alkyl derivatives, and iso-compounds yield tertiary alkyl derivatives. Other isomers undergo a transposition under the influence of the aluminum chloride to yield mixed isomers. Due to the complexity of the products formed it is impossible to give the exact nature of the isomers obtained.

In a similar manner butylene, butyl bromide, or butyl chloride yields butyl benzoyl-o-benzoic acid; propylene, propyl chloride, or propyl bromide yields isopropyl-benzoyl-o-benzoic acid; ethylene, ethyl chloride, or ethyl bromide yields ethyl benzoyl-o-benzoic acid, etc.

The crude acids obtained in this way usually contain in addition to the mono-alkylated derivatives small amounts of di-alkylated and polyalkylated acids. Indeed it is possible to prepare such higher alkylation products by increasing the quantity of unsaturated hydrocarbon or alkyl halide beyond that theoretically required to introduce one alkyl group. Other by-products such as phthalides are also formed.

With the anhydrides of aliphatic dibasic acids such as succinic anhydride or glutaric anhydride the corresponding derivatives of keto-propionic acids or keto-butyric acids are obtained. With anhydrides of unsaturated dibasic acids, such as maleic anhydride, the acids are more complex due to partial addition of the aromatic hydrocarbons to the unsaturated bond.

Instead of benzene, it is possible to use toluene, xylene, ethyl benzene, cymene, naphthalene, and other aromatic hydrocarbons so long as they contain a free position for the alkyl group to enter. Hydroaromatic compounds such as pinene, cyclohexane, methyl cyclohexane may also be used, as well as halogenated or hydroxylated derivatives of aromatic hydrocarbons, such as chlorbenzene, chlortoluene, phenols, etc. Phenols are best condensed in the presence of acetylene tetrachloride as a solvent, as is already known.

Under the influence of the aluminum chloride a double Friedel and Crafts type of reaction takes place. One reaction consists in the combination of the aromatic hydrocarbon with the olefine or its hydrohalide derivative to form an alkylated aromatic hydrocarbon in situ. The other reaction consists in the condensation of the acid anhydride which is present, with this alkylated aromatic hydrocarbon, under the influence of the same anhydrous aluminum chloride. The two reactions take place almost simultaneously so that one charge of aluminum chloride suffices for both reactions. Only a small, catalytic quantity of aluminum chloride is required for the first part of the reaction whereas a molecular equivalent is required for the second phase of the reaction. It is thus possible and advantageous to add at first only a small amount of aluminum chloride to complete the first phase of the reaction, and thereafter to add the remainder of the aluminum chloride for the second part of the reaction.

It is also possible to first condense the dibasic acid anhydride with the aromatic hydrocarbon using the molecular quantity of aluminum chloride, and after the reaction has ceased to complete the alkylation by adding to the reaction mixture the necessary quantity of unsaturated aliphatic hydrocarbon or its hydrohalide derivative.

The simplest method and the one which gives the best results is to simultaneously react a mixture of all the components together using cooling if necessary to moderate the reaction. With volatile compounds such as ethylene, ethyl chloride, propylene, and butylene it is best to carry out the reaction by bubbling the gas through the reaction mixture using rapid stirring.

As illustrating my invention, the following examples are given:

Example 1

45 grams of phthalic anhydride are mixed with 34 grams or normal amyl chloride and 25 grams of dry benzene in a vessel fitted with a reflux condenser and stirrer. The mixture is stirred and cooled with running water to about 15° C. whereupon 90 grams of anhydrous aluminum chloride, finely powdered, is added in small portions at a time. Hydrogen chloride is evolved and the mixture sets to a solid mass. It is heated at 40–50° C. for 4 hours, cooled, diluted with acetylene tetrachloride or o-dichloro-benzene and run into a hot solution of sodium carbonate (250 gram $Na_2CO_3$ in 2500 cc. water). The organic liquids are then steam distilled off. The precipitate of aluminum hydroxide is filtered off and the clear filtrate is acidified with dilute sulphuric acid. Secondary amyl-benzoyl-ortho-benzoic precipitates out as a creamy resinous mass which is washed and dried.

Example 2

Instead of 34 grams of normal amyl chloride as described in Example 1, 34 grams of mixed isomeric amyl chlorides of approximately the following composition are used:

| | |
|---|---|
| $CH_3$—$CH_2$—$CH_2$—$CH_2$—$CH_2Cl$ | 26% |
| $CH_3$—$CH_2$—$CH_2$—$CHCl$—$CH_3$ | 18% |
| $CH_3$—$CH_2$—$CHCl$—$CH_2$—$CH_3$ | 8% |
| $CH_3$>CH—$CH_2$—$CH_2Cl$ / $CH_3$ | 16% |
| $CH_2Cl$>CH—$CH_2$—$CH_3$ / $CH_3$ | 32% |

The product is worked up as above. There is obtained a mixture of isomeric amyl benzoyl-o-benzoic acids as a resinous mass insoluble in water.

Example 3

A reaction mixture of 45 grams phthalic anhydride, 34 gr. amyl chloride, 25 grams benzene, and 100 grams acetylene tetrachloride is treated with 90 grams of anhydrous aluminum chloride as described in Example 1. The reaction mass remains fluid so that the mixture can easily be stirred. The product is worked up as in Example 1 and yields amyl benzoyl-o-benzoic acid.

Example 4

148 grams phthalic anhydride are mixed with 92 gr. toluene and 93 gr. normal butyl chloride. 296 grams anhydrous aluminum chloride are gradually added to the cooled mixture under reflux as described in Example 1. The mixture is heated 4 hrs. at 40° C. and decomposed with 750 grams sodium carbonate dissolved in 7500 cc. water. After steam distilling off traces of volatile material and filtering off the precipitate of aluminum hydroxide, the clear filtrate upon acidification yields secondary butyl toluyl-o-benzoic acid.

Example 5

Instead of 148 grams of phthalic anhydride, 100 grams succinic anhydride are used, the procedure being the same as in Example 4. The product obtained consists essentially of butyl toluoyl-propionic acid.

Example 6

Ethylene gas is bubbled through a very rapidly agitated mixture of 148 grams phthalic anhydride, 296 grams anhydrous aluminum chloride, and 400 grams dry benzene at 80° C. for 24 hours. The acid obtained after hydrolysis and steam distillation as described in Example 4 consists of ethyl benzoyl-ortho-benzoic acid and diethyl benzoyl-o-benzoic acids.

Example 7

148 gr. phthalic anhydride, 75 gr. amylene (methyl-ethyl-ethylene) 106 gr. xylene (meta) and 296 gr. anhydrous aluminum chloride are allowed to react first at 5° C. until no further reaction occurs and then the mixture is heated 3 hrs, at 40° C. The product is added to excess dilute sulphuric acid, the precipitate of crude acid washed with hot water and dried. It forms a yellowish waxy mass of crude isomeric amyl xyloyl-o-benzoic acids.

Example 8

Propylene gas is bubbled through a mixture of 100 gr. succinic anhydride, 296 gr. anhydrous aluminum chloride, and 400 gr. benzene at 70° C. for 24 hrs. Iso-propyl-benzoyl-propionic acid, di-iso-propyl-benzoyl-propionic acid and other propylated isomeric acids are formed by working up the reaction product as described in Example 1.

In a similar manner other suitable anhydrides namely glutaric anhydride and higher homologous anhydrides of aliphatic dibasic acids, may be condensed besides phthalic anhydride, succinic anhydride and maleic anhydride, with other aromatic hydrocarbons and aliphatic compounds as described herein. As catalysts, mixtures of aluminum chloride and ferric chloride may be used; or mixtures of aliphatic unsaturated hydrocarbons and their corresponding hydrohalides may be employed; for example a mixture of amylene and amyl chloride in Example 2. The reactions may be carried out with or without the use of solvents as described herein, and temperatures other than those specified may be employed.

What I claim is:

1. In the process for preparing ketonic acids, the step which comprises reacting upon the anhydride of an organic dibasic acid with anhydrous aluminum chloride, an aromatic hydrocarbon, and a compound of the group consisting of aliphatic olefines and alkyl monohalides.

2. In the process for preparing ketonic acids, the step which comprises reacting upon phthalic anhydride with anhydrous aluminum chloride, an aromatic hydrocarbon, and a compound of the group consisting of aliphatic olefines and alkyl monohalides.

3. In the process for preparing ketonic acids, the step which comprises reacting upon phthalic anhydride with anhydrous aluminum chloride, benzene, and a compound of the group consisting of aliphatic olefines and alkyl monohalides.

4. In the process for preparing ketonic acids, the step which comprises reacting upon phthalic anhydride with anhydrous aluminum chloride, benzene, and a compound of group consisting of amylene and amyl halides.

5. In the process for preparing amyl benzoyl-ortho-benzoic acid, the step which comprises reacting upon phthalic anhydride with anhydrous aluminum chloride, benzene, and amyl chloride.

6. Amyl-benzoyl-ortho-benzoic acid.

7. In the process for preparing ketonic acids, the step which comprises condensing a substance of the class consisting of aromatic hydrocarbons, phenols, and halogenated aromatic hydrocarbons, in the presence of a Friedel-Crafts type of condensing agent with a compound of the group consisting of aliphatic olefines and alkyl monohalides, and an anhydride of a dicarboxyllic acid.

8. A process as set forth in claim 7, in which the reaction is carried out in the presence of an inert solvent.

9. A process as set forth in claim 7 in which the reaction is carried out in the presence of acetylene tetachloride as a solvent.

10. A process as set forth in claim 7 in which the reaction is carried out in the presence of anhydrous aluminum chloride as condensing agent.

11. The process for preparing ketonic acids in which the product obtained in claim 8 is subjected to hydrolysis after condensation is complete.

12. The process for preparing mixed amyl-benzoyl-ortho-benzoic acids which comprises condensing phthalic anhydride, mixed isomeric amyl monochlorides, benzene and anhydrous aluminum chloride in substantially reacting proportions, and thereafter subjecting the reaction product to hydrolysis.

13. Mixed isomeric amyl-benzoyl-ortho-benzoic acids.

14. A process such as described in claim 7 characterized by the fact that the acid anhydride and the aromatic hydrocarbon are first condensed in the presence of the Friedel-Crafts condensing agent and when reaction has ceased the condensation completed with the unsaturated aliphatic hydrocarbon.

15. A process such as described in claim 7 characterized by first condensing the acid anhydride and the aromatic hydrocarbon in the presence of anhydrous aluminum chloride and subsequently completing the condensation with an alkyl monohalide.

16. A process such as described in claim 7 characterized by first condensing the alkyl monohalide and the aromatic hydrocarbon by means of anhydrous aluminum chloride and thereafter, without isolating the product formed, completing the condensation with the anhydride of a dicarboxyllic acid.

HERMAN ALEXANDER BRUSON.